(12) United States Patent
Li

(10) Patent No.: US 10,828,945 B2
(45) Date of Patent: Nov. 10, 2020

(54) CONNECTION STRUCTURE BETWEEN TIRE PRESSURE MONITORING SENSOR AND TIRE VALVE

(71) Applicant: Baolong Huf Shanghai Electronic Co., Ltd., Shanghai (CN)

(72) Inventor: Wei Li, Shanghai (CN)

(73) Assignee: BAOLONG HUF SHANGHAI ELECTRONIC CO., LTD., Shanghai (CN)

( * ) Notice: Subject to any disclaimer, the term of this patent is extended or adjusted under 35 U.S.C. 154(b) by 156 days.

(21) Appl. No.: 16/318,630

(22) PCT Filed: Jul. 4, 2017

(86) PCT No.: PCT/CN2017/091683
§ 371 (c)(1),
(2) Date: Jan. 17, 2019

(87) PCT Pub. No.: WO2018/014724
PCT Pub. Date: Jan. 25, 2018

(65) Prior Publication Data
US 2019/0217672 A1 Jul. 18, 2019

(30) Foreign Application Priority Data
Jul. 18, 2016 (CN) .......................... 2016 1 0565539

(51) Int. Cl.
*B60C 23/04* (2006.01)
(52) U.S. Cl.
CPC .......... *B60C 23/0494* (2013.01); *B60C 23/04* (2013.01)
(58) Field of Classification Search
CPC .. G01M 17/02; G01M 17/021; G01M 17/022; G01M 17/027; G01M 17/025;
(Continued)

(56) References Cited

U.S. PATENT DOCUMENTS 9,272,588 B1 * 3/2016 Groom ................. B60C 29/02
2004/0084124 A1 5/2004 Martin
(Continued)

FOREIGN PATENT DOCUMENTS

| CN | 201890098 | 7/2011 |
|---|---|---|
| CN | 102259566 | 11/2011 |

(Continued)

OTHER PUBLICATIONS

International Search Report, issued in the corresponding PCT Application No. PCT/CN2017/091683, dated Oct. 11, 2017, 7 pages.

*Primary Examiner* — Andre J Allen
(74) *Attorney, Agent, or Firm* — Hamre, Schumann, Mueller & Larson, P.C.

(57) ABSTRACT

The present invention provides a connection structure between a tire pressure monitoring sensor and a tire valve. The connection structure comprises a tire valve and a tire pressure monitoring sensor, wherein the tire valve comprises a valve stem and a rubber body disposed outside the valve stem, one end of the valve stem is provided with an external thread, and a bump is formed on the rubber body; and the tire pressure monitoring sensor comprises a housing, a boss with a threaded hole is formed on the housing, and the housing is formed with a recess on the side where the boss is situated. Among other things, the valve stem extends into the threaded hole of the boss, such that the threaded hole of the boss engages with the external thread of the valve stem, and the bump extends into the recess and is snap-fitted with the recess. The connection structure between a tire pressure monitoring sensor and a tire valve provided by the present invention ensures that the tire pressure monitoring sensor and the tire valve are firmly connected and work in a stable and reliable manner.

10 Claims, 4 Drawing Sheets

(58) Field of Classification Search
CPC ...... G01M 17/024; G01M 17/10; G01M 7/08;
G01M 17/0076; G01M 17/013; G01M
17/03; G01M 17/04; G01M 17/06; G01M
17/08; G01M 1/02; G01M 1/045; G01M
1/12; G01M 1/225; G01M 3/04; G01M
3/40; G01M 5/0091; G01M 7/02; G01M
99/00; G01M 99/002; B60C 23/0494;
B60C 2019/004; B60C 23/0493; B60C
23/064; B60C 19/00; B60C 23/04; B60C
23/0488; B60C 23/0498; B60C 23/0496;
B60C 23/0408; B60C 23/041; B60C
23/0411; B60C 23/06; B60C 23/20; B60C
11/246; B60C 23/0486; B60C 23/061;
B60C 11/243; B60C 99/00; B60C
11/0083; B60C 13/003; B60C 2009/2038;
B60C 23/004; B60C 23/02; B60C
23/0401; B60C 23/0406; B60C 23/0416;
B60C 23/0433; B60C 23/0455; B60C
23/0459; B60C 23/0474; B60C 23/0489;
B60C 23/0491; B60C 25/002; B60C
25/005; B60C 25/007; B60C 29/02; B60C
3/04; B60C 99/006; B60C 11/0332; B60C
11/24; B60C 13/001; B60C 13/02; B60C
15/0036; B60C 17/02; B60C 2009/0071;
B60C 2009/2022; B60C 2200/02; B60C
2200/06; B60C 2200/065; B60C 23/00;
B60C 23/001; B60C 23/003; B60C
23/007; B60C 23/008; B60C 23/0413;
B60C 23/0427; B60C 23/0447; B60C
23/0454; B60C 23/0457; B60C 23/0462;
B60C 23/0471; B60C 23/0472; B60C
23/0476; B60C 23/0479; B60C 23/0484;
B60C 23/065; B60C 23/066; B60C 23/10;
B60C 25/0548; B60C 25/056; B60C
25/132; B60C 25/138; B60C 29/005;
B60C 9/005; B60C 9/18; B60C 9/1807;
B60C 9/20; B60C 9/28; G01L 17/00;
G01L 17/005; G01L 19/0645; G01L
19/147; G01L 1/16; G01L 1/18; G01L
7/187; G01L 9/0052; G01L 9/008
USPC .................................................. 73/146–146.8
See application file for complete search history.

(56) References Cited

U.S. PATENT DOCUMENTS

| | | | | |
|---|---|---|---|---|
| 2005/0069667 | A1* | 3/2005 | Wacker | B60C 23/0408 |
| | | | | 428/40.1 |
| 2005/0087006 | A1* | 4/2005 | Uleski | B60C 23/0408 |
| | | | | 73/146 |
| 2008/0149244 | A1* | 6/2008 | Liao | B60C 23/0408 |
| | | | | 152/427 |
| 2008/0276995 | A1* | 11/2008 | Ray | B60C 23/0408 |
| | | | | 137/227 |
| 2009/0095359 | A1* | 4/2009 | Campau | F16K 15/207 |
| | | | | 137/226 |
| 2011/0192221 | A1* | 8/2011 | Wang | B60C 23/0496 |
| | | | | 73/146.8 |
| 2013/0106597 | A1* | 5/2013 | Sham | B60C 23/0491 |
| | | | | 340/447 |
| 2019/0217672 | A1* | 7/2019 | Li | B60C 23/04 |

FOREIGN PATENT DOCUMENTS

| | | |
|---|---|---|
| CN | 104859387 | 8/2015 |
| CN | 204567162 | 8/2015 |
| CN | 205800674 | 12/2016 |
| JP | 2013-244754 | 12/2013 |
| JP | 5918027 | 5/2016 |

\* cited by examiner

CONNECTION STRUCTURE BETWEEN TIRE PRESSURE MONITORING SENSOR AND TIRE VALVE

TECHNICAL FIELD

The present invention belongs to the technical field of automobiles and relates to a connection structure between a tire pressure monitoring sensor (TPMS) and a tire valve.

BACKGROUND ART

FIG. 5 is a connection structure between a tire pressure monitoring sensor and a tire valve in the prior art. With reference to FIG. 5, a tire pressure monitoring sensor 51 is assembled to a rim via a rubber tire valve 52. The rubber tire valve 52 can inflate and deflate the rim and is usually composed of a copper valve stem and an outer rubber piece, with a dust cap 53 provided at a tail portion for protection.

At present, the connection structure between a tire pressure monitoring sensor and a tire valve is usually assembled in such a manner that the tire pressure monitoring sensor 51 is a separate part and the rubber tire valve 52 is a separate part, the copper valve stem of the rubber tire valve 52 is provided with a threaded hole, the tire pressure monitoring sensor 51 and the rubber tire valve 52 are connected via a screw 54, and the screw 54 is engaged with the threaded hole of the copper valve stem, so that the tire pressure monitoring sensor 51 and the rubber tire valve 52 are firmly connected as a whole. A main control chip in an electronic module provided in the tire pressure monitoring sensor 51 detects and senses the gas pressure in the interior of a tire outside the rim.

With regard to this mounting method, since the tire pressure monitoring sensor 51 has a certain weight as a whole, during use, the high-speed rotation of the rim can generate a large centrifugal force acting on the electronic module of the tire pressure monitoring sensor 51, and its overall bearing force finally acts on the screw 54 that plays the role of fastening and coupling. In addition, when the vehicle encounters vibration or complicated road conditions during driving, the screw 54 tends to loosen and fall off, causing the tire pressure monitoring sensor 51 to leave an installation position and fail to detect the tire pressure normally.

SUMMARY OF THE INVENTION

The technical problem to be solved by the present invention is to provide a connection structure between a tire pressure monitoring sensor and a tire valve to ensure that the tire pressure monitoring sensor and the tire valve are firmly connected and the tire pressure monitoring sensor works in a stable and reliable manner.

In order to solve the above technical problem, the present invention provides a connection structure between a tire pressure monitoring sensor and a tire valve, comprising:

a tire valve, comprising a valve stem and a rubber body disposed outside the valve stem, one end of the valve stem being provided with an external thread, and a bump being formed on the rubber body; and a tire pressure monitoring sensor comprising a housing, a boss with a threaded hole being formed on the housing, and the housing being formed with a recess on the side where the boss is situated;

wherein the valve stem extends into the threaded hole of the boss, such that the threaded hole of the boss engages with the external thread of the valve stem, and the bump extends into the recess and is snap-fitted with the recess.

According to an embodiment of the present invention, the recess is an arc-shaped recess with different recess depths on two sides.

According to an embodiment of the present invention, a reverse snap is formed on an outer edge of the boss.

According to an embodiment of the present invention, the tire pressure monitoring sensor further comprises a sensor chip, a PCB and a battery which are sequentially arranged in the housing, the sensor chip is electrically connected to the PCB, and the battery supplies power to the PCB; and the tire pressure monitoring sensor further comprises a cover plate, and the cover plate cooperates with the housing to form a sealed space within the housing.

According to an embodiment of the present invention, the housing and the cover plate are welded into one piece.

According to an embodiment of the present invention, the housing is provided with a pressure communication hole on the side where the boss is situated, and the pressure communication hole is in communication with the sensor chip.

According to an embodiment of the present invention, the tire pressure monitoring sensor further comprises a sealing rubber gasket which is of a hollow structure and is provided between the pressure communication hole and the sensor chip.

According to an embodiment of the present invention, a metal strip medium is sprayed on the surface of the housing to form an antenna.

According to an embodiment of the present invention, the housing is provided with a first inflation and deflation channel on the side where the boss is situated, a notch is formed in the external thread of the valve stem, a second inflation and deflation channel is formed between the notch and the boss after the threaded hole of the boss is engaged with the external thread of the valve stem, and the first inflation and deflation channel and the second inflation and deflation channel are in communication with each other.

The connection structure between a tire pressure monitoring sensor and a tire valve provided by the present invention has a self-locking function, resulting in a firm connection structure between the two, and enabling the tire pressure monitoring sensor to work in a stable and reliable manner.

BRIEF DESCRIPTION OF THE DRAWINGS

The features and properties of the present invention are further described by the following embodiments and the drawings thereof.

DETAILED DESCRIPTION OF EMBODIMENTS

Figure 1:
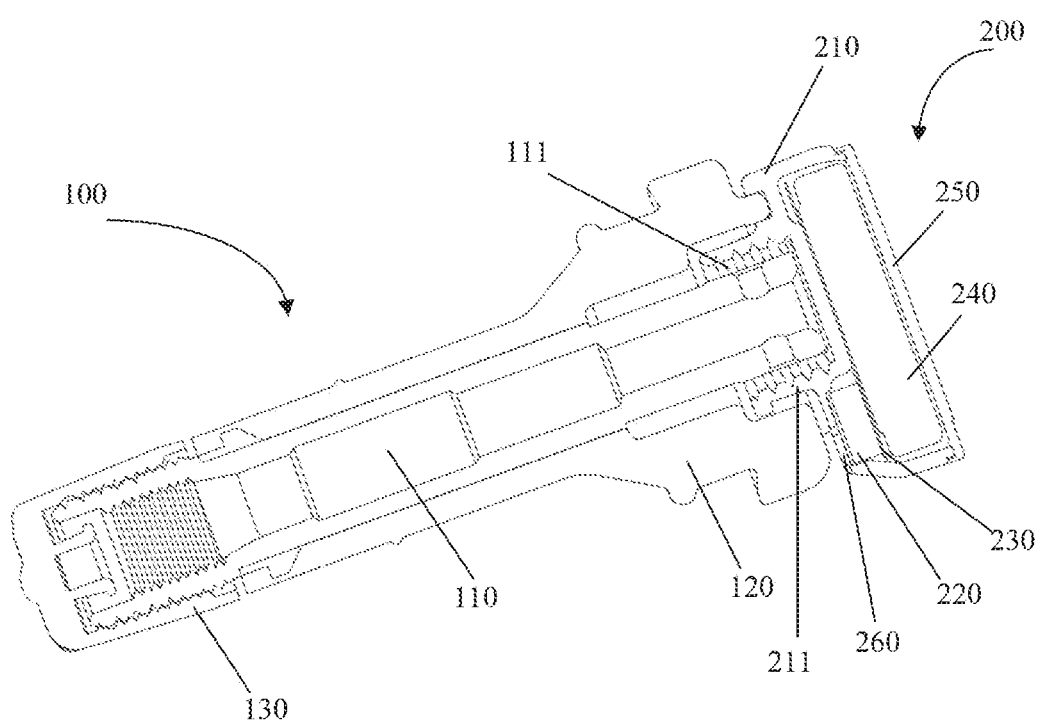
FIG. 1 shows a structural schematic diagram of an embodiment of the present invention.
Figure 2:
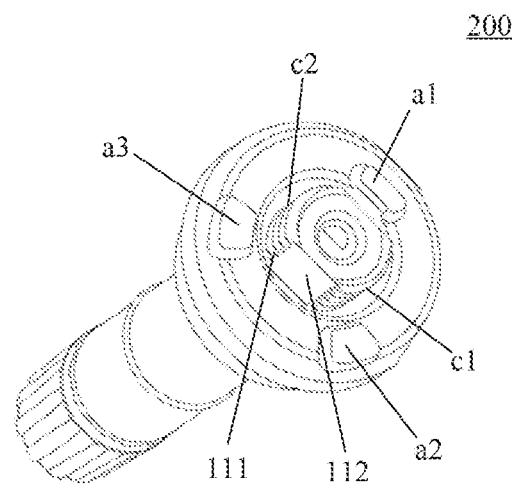
FIG. 2 is a structural schematic diagram of a tire valve in FIG. 1.
Figure 3:
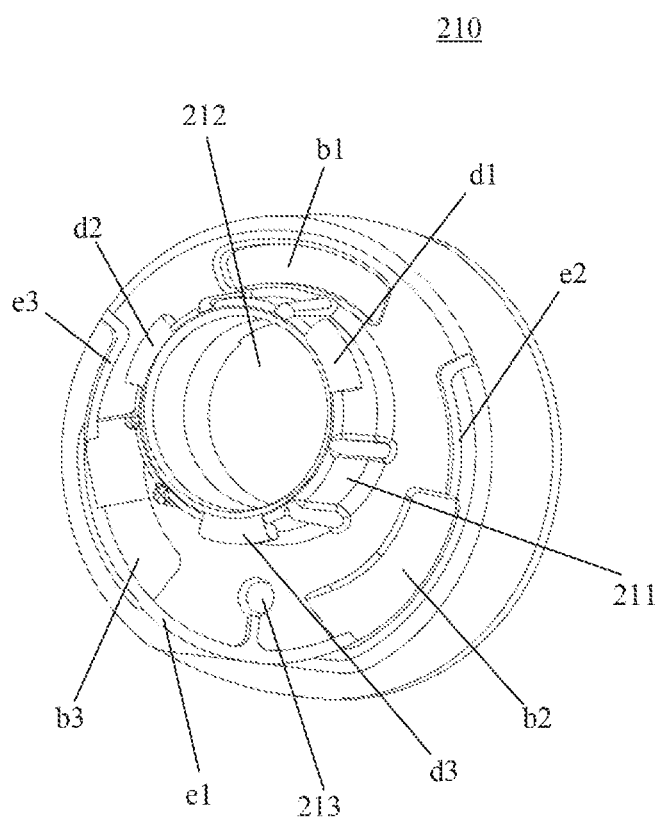
FIG. 3 is a structural schematic diagram of a housing in FIG. 1.
Figure 4:
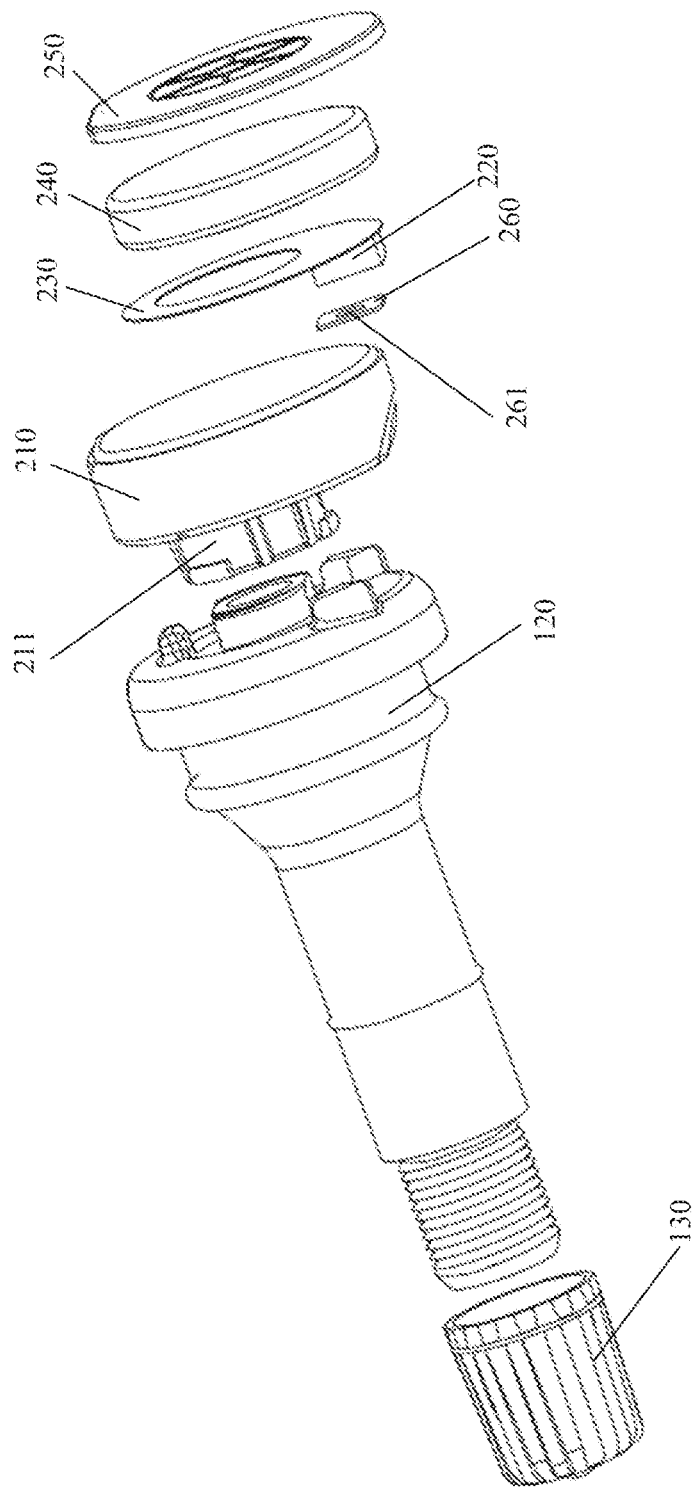
FIG. 4 is an assembly schematic diagram of FIG. 1.
Figure 5:
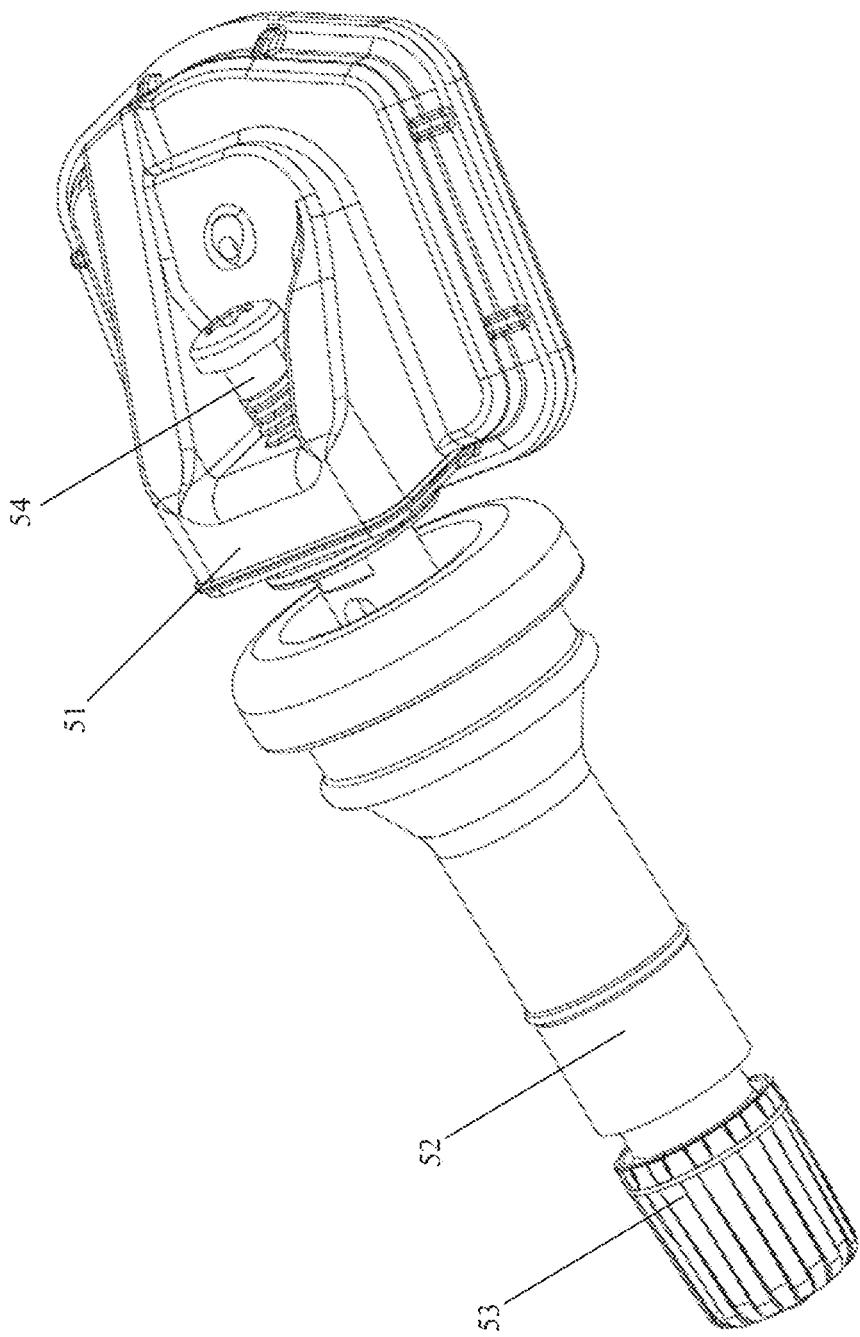
FIG. 5 shows a structural schematic diagram of a connection structure between a tire pressure monitoring sensor and a tire valve in the prior art.

FIG. 1 shows a structural schematic diagram of an embodiment of the present invention. FIG. 2 is a structural schematic diagram of a tire valve in FIG. 1. FIG. 3 is a structural schematic diagram of a housing in FIG. 1. FIG. 4 is an assembly schematic diagram of FIG. 1. As shown in the figures, a connection structure between a tire pressure monitoring sensor and a tire valve mainly comprises a tire valve 100 and a tire pressure monitoring sensor 200. The tire pressure monitoring sensor 200 is assembled to a rim via the tire valve 100. The tire valve 100 can inflate and deflate the rim. The tire pressure monitoring sensor 200 monitors the gas pressure in the interior of a tire outside the rim.

Among other things, the tire valve 100 comprises a valve stem 110 and a rubber body 120 disposed outside the valve stem 110. An external thread 111 is provided at one end of the valve stem 110 (the side close to the tire pressure monitoring sensor 200). A bump is formed on the rubber body 120. By way of example but not limitation, in this embodiment, three bumps a1, a2 and a3 are formed on the rubber body 120.

The tire pressure monitoring sensor 200 comprises a housing 210. A boss 211 having a threaded hole 212 is formed on the housing 210. The housing 210 is formed with a recess on the side where the boss 211 is situated. By way of example but not limitation, in this embodiment, three recesses b1, b2 and b3 are formed on the boss 211.

In such a connection structure, the connection between the tire pressure monitoring sensor 200 and the tire valve 100 is realized without screws in the prior art. During the assembly of the two, the valve stem 110 of the tire valve 100 extends into the threaded hole 212 of the boss 211 of the housing 210, and the threaded hole 212 of the boss 211 engages with the external thread 111 of the valve stem 110. In addition, during the installation of the tire valve 100 into the rim, the rubber body 120 is deformed under pressure, and the bumps a1, a2 and a3 of the rubber body 120 extend into the recesses b1, b2 and b3 of the housing 210. Because the rubber body 120 is further resisted by the boss 210, the rubber body 120 is deformed and expands naturally, and the volume of the bumps a1, a2 and a3 will also increase, so that the bumps will be firmly locked with the recesses b1, b2 and b3 and will not be easily loosened.

Further, the recesses b1, b2 and b3 are arc-shaped recesses with different recess depths (the depth of the arc-shaped recesses) on two sides of each of the arc-shaped recesses. One side of the arc-shaped recess is shallow and the other side thereof is deep. When extending into the recesses b1, b2 and b3, the bumps a1, a2 and a3 first enter the shallow side of the recesses b1, b2 and b3 and then continue to screw into the boss 211, such that the bumps a1, a2 and a3 continue to slide toward the deep side of the recesses b1, b2 and b3 and finally engage in the arc-shaped recesses. Since one side of the arc-shaped recess is shallow and the other side thereof is deep, it is easier for the bumps a1, a2 and a3 to enter the recesses b1, b2 and b3 from the shallow side to the deep side, but it is relatively difficult to move in the opposite direction. The structure of the arc-shaped recess with different recess depths on two sides can prevent the bumps a1, a2 and a3 from easily exiting the recesses b1, b2 and b3, so that the connection structure between the tire pressure monitoring sensor 200 and the tire valve 100 is more secure and will not fall off easily.

Preferably, a reverse snap is formed on an outer edge of the boss 211 of the housing 210. By way of example but not limitation, in this embodiment, the outer edge of the boss 211 is formed with three reverse snaps d1, d2 and d3. The three reverse snaps d1, d2 and d3 extend into the tire valve 100 during installation, and the rubber body 120 is compressed during the process of screwing the tire valve 100 into and clamping the rim, moving toward the boss 211 to form a clamping position, thereby clamping the valve stem 110 and functioning to secure the installation and prevent loosening.

Further, the tire pressure monitoring sensor 200 also comprises a sensor chip 220, a PCB 230 and a battery 240 that are sequentially arranged in the housing 210. The sensor chip 220 is electrically connected to the PCB 230. The PCB 230 is made of flexible materials such as those used in an FPC board. The battery 240 is attached to and supplies power to the PCB 230 by means of electrical connection. The tire pressure monitoring sensor 200 also comprises a cover plate 250. The cover plate 250 cooperates with the housing 210 to form a sealed space within the housing 210.

As shown in FIG. 4, the shell 210 and the cover plate 250 are approximately circular in shape, and the PCB 230 and the battery 240 are both approximately circular in shape and have an outer diameter slightly smaller than the outer diameter of the shell 210. The cover plate 250, the battery 240, the PCB 230 and the sensor chip 220 are vertically assembled and arranged in tiers. The tire valve 100 is further provided with a dust cap 130 to protect the tire valve 100.

In an embodiment, with reference to FIG. 3, the housing 210 is provided with a pressure communication hole 213 on the side where the boss 211 is situated. The pressure communication hole 213 is in communication with the sensor chip 220. The sensor chip 220 senses tire pressure, temperature and other information via the pressure communication hole 213 in the housing 210.

In an embodiment, with reference to FIG. 4, the tire pressure monitoring sensor 200 further comprises a sealing rubber gasket 260. The sealing rubber gasket 260 is of a hollow structure and has a central gas channel 261. The sealing rubber gasket 260 is disposed between the pressure communication hole 213 and the sensor chip 220. One end of the central gas channel 261 is connected to the sensor chip 220, and the other end is in communication with the pressure communication hole 213 to maintain the communication and sealing of the pressure communication hole 213 with the sensor chip 220.

In an embodiment, after the tire pressure monitoring sensor 200 is assembled, the housing 210 and the cover plate 250 are welded by laser as a whole and sealed.

In another embodiment, an antenna of the tire pressure monitoring sensor 200 forms a metal strip medium on the surface of the housing 210 by means of metal spraying, and the antenna has no connection relationship with the tire valve 100.

With reference to FIGS. 2 and 3, the housing 210 is provided with a first inflation and deflation channel on the side where the boss 211 is situated. By way of example but not limitation, in this embodiment, the housing 210 is provided with three first inflation and deflation channels e1, e2 and e3. A notch 112 is formed in the external thread 111 of the valve stem 110, that is, the end of the valve stem 110 having the external thread 111 can be designed to resemble a flat square structure. After the threaded hole 212 of the boss 211 is engaged with the external thread 111 of the valve stem 110, a second inflation and deflation channel is formed between the notch 112 and the boss 211. The first inflation and deflation channels e1, e2 and e3 and the second inflation and deflation channel are in communication with each other and with the pressure communication hole 213, and communicate with the space within a tire outside the rim to form a smooth inflation and deflation path. When the connection structure of the present invention is assembled to the rim, inflation and deflation is realized through the center of the valve stem 110, and the pressure communication hole 213 in the housing 210 communicates with the inflation and deflation path, so that the sensor chip 220 communicates with the inner space of the rim, thereby sensing information such as gas pressure and temperature in the tire.

The installation process of a connection structure between a tire pressure monitoring sensor and a tire valve provided by the present invention can be divided into two steps. The first step is a pre-installation stage of the tire pressure monitoring sensor 200 and the tire valve 100, in which stage the tire valve 100 and the tire pressure monitoring sensor 200 are connected as a whole by threaded fit. When the bumps a1, a2 and a3 on the rubber body 120 come into contact with the recesses b1, b2 and b3 of the housing 210, the threaded connection ends and the pre-installation ends at the same time. The second step is an installation stage of the connection structure and the rim, in which stage the self-locking installation of the tire valve 100 and the tire pressure monitoring sensor 200 is also completed. In this stage, the tire valve 100 is installed from inside to outside of the rim. Since the diameter of the rubber body 120 of the tire valve 100 is greater than the diameter of an installation hole in the rim, normal and reasonable deformation can occur and the rubber body 120 will naturally expand in the process of screwing the tire valve 100 into the rim. The bosses a1, a2 and a3 will snap into the recesses b1, b2 and b3 of the housing 210 to form stop positions, while the deformed and expanded rubber body 120 will snap into the three reverse snaps d1, d2 and d3 provided in the mounting center of the electronic module housing 210 to form clamping positions to clamp the valve stem 110, and at the same time the tire valve 100 and the tire pressure monitoring sensor 200 can be prevented from rotating along with a snap-fit structure formed by the bosses a1, a2 and a3 and the recesses b1, b2 and b3, thus functioning to secure the installation and prevent loosening. At this time, the fastening and mounting of the connection structure and the rim are completed, the connection and fixation of the tire valve 100 and the tire pressure monitoring sensor 200 are completed by means of the cooperation of the bosses a1, a2 and a3 and the recesses b1, b2 and b3, and the loosening of the connection is further prevented by the reverse snaps d1, d2 and d3, thus providing a doubled clamping effect. Therefore, when the tire valve 100 carries out inflation or deflation, the second inflation and deflation channel in the valve stem 110 can be communicated with the first inflation and deflation channels e1, e2 and e3 in the housing 210 to thus achieve inflation and deflation of the tire.

The connection structure between a tire pressure monitoring sensor and a tire valve provided by the present invention has the following advantages:

1. The tire valve and the housing of the tire pressure monitoring sensor will be self-locked. A locking and anti-loosening structure is designed by utilizing the installation deformation of the rubber body of the tire valve, such that during rim rotation, centripetal force will further the tire pressure monitoring sensor, making the connection structure firmer and preventing the tire pressure monitoring sensor from loosening and falling off.

2. Because the tire valve and the tire pressure monitoring sensor are in interference fit, the two are in direct contact and connection without requiring screws, and the possibility of interference with the rim is less. The tire pressure monitoring sensor is vertically and integrally assembled, has a compact structure, a smaller volume and lighter weight, and is widely applied.

3. Due to the interference fit between the tire valve and the tire pressure monitoring sensor, when the tire pressure monitoring sensor moves toward the outside of the rim, its center of gravity also moves toward the outside of the rim, and its stability and reliability are higher during use.

It is apparent to those skilled in the art that various modifications and variations can be made to the above-mentioned exemplary embodiments of the present invention without departing from the spirit and scope of the present invention. Therefore, it is intended that the present invention covers modifications and variations of the present invention that falls within the scope of the appended claims and the equivalent technical solutions thereof.

The invention claimed is:

1. A connection structure between a tire pressure monitoring sensor and a tire valve, comprising:
   a tire valve, comprising a valve stem and a rubber body disposed outside the valve stem, one end of the valve stem being provided with an external thread, and a bump being formed on the rubber body; and
   a tire pressure monitoring sensor comprising a housing, a boss with a threaded hole being formed on the housing, and the housing being formed with a recess on the side where the boss is situated;
   wherein the valve stem extends into the threaded hole of the boss, such that the threaded hole of the boss engages with the external thread of the valve stem, and the bump extends into the recess and is snap-fitted with the recess.

2. The connection structure of claim 1, wherein the recess is an arc-shaped recess with different recess depths on two sides.

3. The connection structure of claim 1, wherein a reverse snap is formed on an outer edge of the boss.

4. The connection structure of claim 3, wherein the housing is provided with a first inflation and deflation channel on the side where the boss is situated, a notch is formed in the external thread of the valve stem, a second inflation and deflation channel is formed between the notch and the boss after the threaded hole of the boss is engaged with the external thread of the valve stem, and the first inflation and deflation channel and the second inflation and deflation channel are in communication with each other.

5. The connection structure of claim 1, wherein the tire pressure monitoring sensor further comprises a sensor chip, a PCB and a battery which are sequentially arranged in the housing, the sensor chip is electrically connected to the PCB, and the battery supplies power to the PCB; and the tire pressure monitoring sensor further comprises a cover plate, and the cover plate cooperates with the housing to form a sealed space within the housing.

6. The connection structure of claim 5, wherein the housing and the cover plate are welded into one piece.

7. The connection structure of claim 5, wherein the housing is provided with a pressure communication hole on the side where the boss is situated, and the pressure communication hole is in communication with the sensor chip.

8. The connection structure of claim 7, wherein the tire pressure monitoring sensor further comprises a sealing rubber gasket which is of a hollow structure and is provided between the pressure communication hole and the sensor chip.

9. The connection structure of claim 1, wherein a metal strip medium is sprayed on the surface of the housing to form an antenna.

10. The connection structure of claim 1, wherein the housing is provided with a first inflation and deflation channel on the side where the boss is situated, a notch is formed in the external thread of the valve stem, a second inflation and deflation channel is formed between the notch and the boss after the threaded hole of the boss is engaged with the external thread of the valve stem, and the first inflation and deflation channel and the second inflation and deflation channel are in communication with each other.

\* \* \* \* \*